United States Patent
Nakajo et al.

[15] 3,645,776
[45] Feb. 29, 1972

[54] PROCESS FOR PREPARATION OF LEATHERLIKE SHEET MATERIAL WITH EXCELLENT LASTABILITY

[72] Inventors: Shogo Nakajo, Nishinomiya; Yoshitami Saito, Kurashiki, both of Japan

[73] Assignee: Luraray Co., Ltd., Kurashiki, Japan

[22] Filed: Nov. 12, 1968

[21] Appl. No.: 775,141

[30] Foreign Application Priority Data

Nov. 21, 1967 Japan....................................42/74906
Jan. 23, 1968 Japan....................................43/4133

[52] U.S. Cl..............................117/64, 117/135.5, 117/65.2, 210/506, 264/41, 264/48
[51] Int. Cl..............................................................B44d 1/44
[58] Field of Search.......................117/63, 64, 135.5, 143; 264/41, 49; 210/506, 507, 508

[56] References Cited

UNITED STATES PATENTS

| | | | |
|---|---|---|---|
| 2,944,294 | 7/1960 | Bourdeau | 117/63 |
| 3,000,757 | 9/1961 | Johnston et al. | 117/63 |
| 3,067,482 | 12/1962 | Hollowell | 117/63 X |
| 3,100,721 | 8/1963 | Holden | 117/135.5 |
| 3,190,766 | 6/1965 | Yuan | 117/135.5 X |
| 3,369,925 | 2/1968 | Matsushita et al. | 117/63 |
| 2,819,981 | 1/1958 | Schornstheimer | 117/135.5 |

Primary Examiner—William D. Martin
Assistant Examiner—William R. Trenor
Attorney—Stevens, Davis, Miller & Mosher

[57] ABSTRACT

Leatherlike sheet material is prepared by impregnating a nonwoven fibrous mat or napped cloth with a solution of polymeric material, coagulating the solution by wet method to form a homogeneous fine sponge structure without sticking to the fibers and then contacting the impregnated mat or cloth with a heated surface at an elevated temperature above softening temperature of the polymeric material to soften the polymeric material and to form a thin polymer film on the surface of the impregnated mat or cloth.

15 Claims, No Drawings

PROCESS FOR PREPARATION OF LEATHERLIKE SHEET MATERIAL WITH EXCELLENT LASTABILITY

The present invention relates to a process for preparing leatherlike sheet materials having a high surface hardness and an excellent lastability.

It is well known that sheet materials comprising fibrous substrate such as unwoven or woven cloths and surfacing layer of polymeric material can be used as substitutes for leather.

However, these sheet materials consisted of two distinctly distinguishable layers, namely the substrate and layer of polymeric material, so that they didn't give as a whole an integrated feeling, and the polymeric layer was so thick that the surface hardness was small and its lastability was inferior.

The object of the present invention is to provide a method of preparation of leatherlike sheet materials which have a thin covered polymer layer, give a good integrated feeling between the polymer layer and substrate, have a large surface hardness and show an excellent lastability.

The method of the present invention comprises; impregnating nonwoven fibrous mat or fully napped cloth with a solution of polymeric material, coagulating the solution by wet coagulation to form a homogeneous fine sponge structure, and heating the impregnated mat or cloth by contacting with a heated surface at an elevated temperature above the softening temperature of the polymeric material, thereby, the polymeric material is softened and a thin polymer film is formed over the surface of the impregnated mat or cloth.

One of the most remarkable characteristics of the present invention is to form a thin film of polymeric material over the surface by raising to the surface the polymeric material impregnated in the substrate by heat treatment with a heating surface and simultaneously by binding fluffs which are rendered to be laid down by heating on the surface of the substrate into the polymeric material, instead of the well-known method in which the layer of polymeric material is formed over the surface by coating or pasting. Consequently, the layer of polymeric material of the sheet material obtained by the present invention is very thin in the thickness, large in the surface hardness and excellent in its lastability and forms a small gap between the polymeric material and fiber because fiber is contained in the covering layer of the polymeric material, so that air and moisture permeability is excellent.

The important point in the present invention is to coagulate the impregnated polymer solution to form a homogeneous fine sponge structure without being adhered on the fiber.

If the polymer solution is coagulated so as to be adhered on the fiber to an extreme extent, or if it forms a heterogeneous sponge structure containing many big air bubbles, it becomes difficult to produce a flat thin film covering the whole surface of the impregnated mat or cloth, even by treatment with a heated plate.

One method, by which a homogeneous fine sponge structure can be formed from the impregnated polymer solution without being adhered on the fiber, is to keep the coagulating bath at a comparatively low temperature (preferably below 40° C.) and to decrease the solvent content in the bath (preferably below 40 percent). Another method is preferably to dissolve or disperse a nonsolvent for the polymer compounds, or a solid insoluble in the coagulating liquid into the impregnating polymer solution, this method can be most preferably used together with the above-mentioned methods.

It is preferred that before the impregnated mat is heated, the impregnated mat is covered with a material which can be converted into a liquid film having some affinity to the heated surface between the impregnated mat and the heated surface when the mat was heated with the heated surface. We call this material an interposition substance hereinafter.

Even though the surface of impregnated mat is apparently even, it is very uneven and rugged microscopically. Then heat transfer and press are not uniform on such a surface when the surface is heated and pressed by a heating surface. These factors cause the difficulty to make the even covered film on the surface. However, in the case when the impregnated mat is covered with an interposition substance, the liquid film having some affinity to the heated surface is formed between the mat and the heating surface by treatment of the heating surface. Therefore the heat transfer and press to mat are effected uniformly due to this liquid film. In this process, impregnated polymer in the mat is spread up and is converted into the thin and even layer on the surface.

The interposition substances include, for example, sorbitol monostearate, various silicon resins, fatty acids, ethyleneimine, amides, various surfactants having carbonyl group.

Various surface can be used for heating the impregnated mat. Because it can be used continuously, rollers heated by electricity, steam and heated fluids are most appropriate.

The temperature of the heated surface should be above the softening temperature of the impregnated polymer. If polyurethane elastomers are used as polymeric material, the temperature should be above 180° C. and is most preferably 190° C. 240° C.

As a polymeric material, thermoplastic polymers can be used. Polyurethane elastomer is the best, and polyvinyl chloride, polyamide and polyacrylates can also be used. These may be used alone or in admixture with other polymer.

The above explanation is for the unwoven fiber mats. The present invention can be applied to felts and other fully napped cloths.

The present invention is further set forth in the following examples. All parts and percentages are based on weight.

EXAMPLE 1

Needle-punched web was produced by using mixed-spun fibers (3 denier, 50 mm.) of nylon 6 and polystyrene (50:50). The web was impregnated with a solution consisting of 20 parts of polyurethane, 7 parts of dimethyl formamide and 3 parts of water in the amount of 400 percent of weight of the web. The web was immersed in a coagulating liquid consisting of 30 parts of dimethyl formamide and 70 parts of water at 30° C. for 20 minutes to coagulate polyurethane elastomer, and washed with water. Then polystyrene in the fibers was extracted with hot toluene at 80° C. Finally the web was dried by hot air at 120° C.

The impregnated mat was brought into contact with chromium-plated roller having a surface temperature of 200° C. and polyurethane elastomer existing in upper part of the impregnated web was softened and a thin film was produced over the surface.

The sheet material thus obtained had a thin surface-covering layer and a large surface hardness and was a flexible sheet material, as shown in Table 1.

TABLE 1

|  | Present invention | Conventional materials |
|---|---|---|
| Thickness of the surface-covering layer (mm.) | 0.03 | 0.2–0.5 |
| Hardness of the surface-covering layer (1) (mm.) | 0.05 | 0.1–0.2 |
| Bending resistance (2) (mg.) | 1700 | 2,000–3,500 |

Note (1): The surface hardness is the width of the scratch by Clemen's method. (Weight 200 g., Stainless pinhead, angle 90°).

Note (2): The bending resistance is the load by Gahle method.

EXAMPLE 2

An woven cloth of a 1.0 mm. thickness, one side of which was napped, was impregnated with polyurethane elastomer, in the same manner as described in Example 1.

The napped side of the impregnated napped cloth was ironed by a chromium-plated-plate at 240° C. As a result, the polyurethane elastomer existing near the surface of the cloth was softened and a surface film mixed with napped fibers was formed.

As shown in Table 2, the sheet obtained had a thin surface film and a large surface hardness and was a soft material.

TABLE 2

| | |
|---|---|
| Thickness of the surface film (mm.) | 0.03 |
| Hardness of the surface film (mm.) | 0.05 |
| Bending resistance (mg.) | 1,000 |

What is claimed is:

1. A process for the preparation of a leatherlike sheet material which comprises impregnating a nonwoven fibrous mat or napped cloth with a solution of polymeric material, coagulating the solution by wet coagulation to form a homogeneous fine sponge structure without adhering to the fibers, drying the impregnated mat or cloth and then heating the impregnated mat or cloth by contacting it with a heated surface at a temperature above 180° C. for a sufficient time to soften the polymeric material and cause said polymer to rise to the surface and form a thin film of said polymeric material over the surface of the impregnated mat or cloth.

2. A process as claimed in claim 1, in which coagulation is carried out at a temperature below 40° C.

3. A process as claimed in claim 1, in which the coagulation bath contains less than 40 percent of solvent for the polymeric material.

4. A process as claimed in claim 1, in which the coagulation is carried out in a coagulation bath which has a temperature below 40° C. and contains less than 40 percent of solvent for the polymeric material.

5. A process as claimed in claim 1, in which the polymer solution contains a nonsolvent for the polymer.

6. A process as claimed in claim 1, in which the polymer solution contains a solid insoluble in the coagulating bath.

7. A process as claimed in claim 1, in which the polymeric material is a polyurethane elastomer.

8. A process as claimed in claim 1, in which an interposition substance is applied to the impregnated mat or cloth before heating.

9. A process as claimed in claim 8, in which said interposition substance is selected from the group consisting of sorbitol monostearate, a silicon resin, a fatty acid, ethylene-imine, an amide or a surfactant containing a carbonyl group.

10. A process for the preparation of a leatherlike sheet material which comprises impregnating a nonwoven fibrous mat or fully napped cloth with a solution of polyurethane elastomer, coagulating the solution by treating the solution with a coagulating bath which has a temperature below 40° C. and contains less than 40 percent of solvent for the polyurethane elastomer to form a homogeneous fine sponge structure without adhering to the fibers, drying the impregnated mat or cloth, and then heating the impregnated mat or cloth by contacting it with a heated surface at a temperature above 180° C. for a sufficient time to soften the polyurethane elastomer and cause said polymer to rise to the surface and form a thin film of said polymeric material over the surface of the impregnated mat or cloth.

11. A process as claimed in claim 10, in which an interposition substance is applied to the impregnated mat or cloth before heating.

12. A process as claimed in claim 10, in which said interposition substance is selected from the group consisting of sorbitol monostearate, a silicon resin, a fatty acid, ethylene-imine, an amide or a surfactant containing a carbonyl group.

13. A process as claimed in claim 10, in which the temperature of the heated surface is from 190° to 240° C.

14. A process as claimed in claim 10, in which the solvent for the polyurethane elastomer is dimethyl formamide.

15. A process as claimed in claim 10, in which the nonsolvent for the polyurethane elastomer is water.

* * * * *

FO-1050
(5/69)

UNITED STATES PATENT OFFICE
CERTIFICATE OF CORRECTION

Patent No. 3,645,776          Dated February 29, 1972

Inventor(s) Shogo Nakajo and Yoshitami Saito

It is certified that error appears in the above-identified patent and that said Letters Patent are hereby corrected as shown below:

On the first page, please correct the name of the assignee from "LURARAY CO., LTD." to --KURARAY CO., LTD.--.

Signed and sealed this 3rd day of October 1972.

(SEAL)
Attest:

EDWARD M. FLETCHER, JR.
Attesting Officer

ROBERT GOTTSCHALK
Commissioner of Patents